(12) United States Patent
Dalia

(10) Patent No.: US 11,087,305 B1
(45) Date of Patent: Aug. 10, 2021

(54) SOCIAL NETWORKING METHOD FOR ORGANIZING NIGHTTIME ACTIVITIES

(71) Applicant: Saverio Dalia, Staatsburg, NY (US)

(72) Inventor: Saverio Dalia, Staatsburg, NY (US)

(*) Notice: Subject to any disclaimer, the term of this patent is extended or adjusted under 35 U.S.C. 154(b) by 565 days.

(21) Appl. No.: 15/467,796

(22) Filed: Mar. 23, 2017

Related U.S. Application Data

(60) Provisional application No. 62/366,179, filed on Jul. 25, 2016.

(51) Int. Cl.
G06Q 30/00 (2012.01)
G06Q 20/32 (2012.01)
H04L 29/08 (2006.01)
G06K 19/06 (2006.01)
G06Q 20/10 (2012.01)
G06Q 10/10 (2012.01)
G06Q 30/06 (2012.01)
G06K 7/10 (2006.01)
G06F 3/0482 (2013.01)
G06F 3/0481 (2013.01)
G06Q 50/00 (2012.01)
G06Q 50/12 (2012.01)
G06F 3/0488 (2013.01)
G06F 3/0485 (2013.01)

(52) U.S. Cl.
CPC ......... *G06Q 20/322* (2013.01); *G06F 3/0482* (2013.01); *G06F 3/04817* (2013.01); *G06K 7/10009* (2013.01); *G06K 19/06112* (2013.01); *G06Q 10/1093* (2013.01); *G06Q 20/102* (2013.01); *G06Q 30/0643* (2013.01); *H04L 67/306* (2013.01); *G06F 3/0485* (2013.01); *G06F 3/0488* (2013.01); *G06Q 50/01* (2013.01); *G06Q 50/12* (2013.01); *H04M 2250/22* (2013.01)

(58) Field of Classification Search
None
See application file for complete search history.

(56) References Cited

U.S. PATENT DOCUMENTS 7,788,188 B2  8/2010  Kramer
7,856,360 B2  12/2010 Kramer et al.
9,179,261 B2  11/2015 De Vries
(Continued)

FOREIGN PATENT DOCUMENTS

EP      1176840         1/2002
WO   WO2007090133       8/2007

OTHER PUBLICATIONS

Sweet, Ryan, Increasing Concession Revenue Through Mobile Devices: Ralph Wilson Stadium Offering In-Seat Food Service, 2013, Fisher Digital Publications (Year: 2013).*

*Primary Examiner* — Jeffrey A. Smith
*Assistant Examiner* — Timothy J Kang
(74) *Attorney, Agent, or Firm* — Goldstein Law Offices, P.C.

(57) ABSTRACT

A social networking system for organizing nighttime activities, for use by individual users when attending nighttime venues. A smartphone app may be provided for use by the individual users, for allowing users to create a profile, set venues to be attended, set a group of other individual users they will be attending with, set up payment, purchase drinks and send drinks to other individual users, arrange transportation to and from the venues, and communicate with other individual users.

8 Claims, 24 Drawing Sheets

(56) References Cited

U.S. PATENT DOCUMENTS

| | | | |
|---|---|---|---|
| 2012/0124458 A1* | 5/2012 | Cruzada | H04L 51/32 |
| | | | 715/205 |
| 2012/0284063 A1 | 11/2012 | Almonte | |
| 2013/0132887 A1* | 5/2013 | Amin | G06F 3/048 |
| | | | 715/781 |
| 2014/0046802 A1* | 2/2014 | Hosein | G01R 1/06711 |
| | | | 705/26.61 |
| 2015/0012341 A1* | 1/2015 | Amin | G06Q 30/0283 |
| | | | 705/13 |
| 2015/0161700 A1* | 6/2015 | Mehr | G06Q 30/0611 |
| | | | 705/26.4 |
| 2015/0356664 A1* | 12/2015 | Mackler | G06Q 30/0635 |
| | | | 705/26.81 |
| 2017/0017659 A1* | 1/2017 | Petrauskas | G06F 16/9537 |

\* cited by examiner

My Tab

| | |
|---|---|
| drink | $12 |
| drink | $12 |
| drink | $12 |
| drink | $12 |
| drink | $12 |
| drink | $12 |
| drink | $12 |
| drink | $12 |
| Total | $96 | close tab

*FIG. 6C*

My Tab

TIP

| No Tip | 10% | 15% | 20% | other |
|---|---|---|---|---|

Subtotal: $96
Tip Amount: $10
Total: $106

Let the bartender know what you think

★★★☆☆ pay tab

*FIG. 6D*

SOCIAL NETWORKING METHOD FOR ORGANIZING NIGHTTIME ACTIVITIES

This application is a non-provisional filing of provisional patent application Ser. No. 62/366,179, filed on Jul. 25, 2016 in the United States Patent Office, which is incorporated by reference herein in its entirety.

TECHNICAL FIELD

The present disclosure relates generally to a social networking system. More particularly, the present disclosure relates to a system that organizes and facilitates various nighttime social and entertainment activities.

BACKGROUND

Throughout history and across all cultures, nighttime activities have existed for meeting others and socializing. For more than a century, nightclubs, bars, and pubs have been the center point for socializing. In recent years, however, online social media has been the place that people "meet" that eclipses any counterpart in the physical world. Still, people naturally want to meet others in person.

Meeting people in person—especially at night clubs—lacks many of the conveniences, safeguards, and user experience that people have become accustomed to through their online socializing. People who find it easy to meet others online, find it is not so easy in person at night clubs. People often stick together in groups, and provide few openings for interactions with others.

Going to a club requires arranging certain logistics, including finding transportation. Other than for places within walking distance, such transportation often requires a person to find a bus, taxi, or someone who will be a 'designated driver'.

Since money is required at any such venue for admission and to purchase drinks, a club goer must often carry their wallet, including cash and credit cards. The problem with doing so is that in the noisy and crowded environment of a typical night club, their wallet can be easily lost—especially after consuming alcohol.

Various systems have been proposed by others for searching and rating restaurants and venues, and for allowing mobile payments to such establishments. While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a social networking system that facilitates nighttime entertainment and socialization for numerous individual users. Accordingly, the present disclosure provides a smartphone app that organizes, suggests, and facilitates travel and interaction with numerous nighttime venues, as well as facilitating connection between the users, where appropriate.

It is another aspect of an example embodiment in the present disclosure to provide a social networking system that facilitates payment at participating venues, so that individual users do not need to carry money while patronizing such venues.

It is yet another aspect of an example embodiment in the present disclosure to provide a social networking system that allows an individual user to organize his or her nighttime itinerary. Accordingly, the app allows participating venues to be searched, selected, and added to the individual user's itinerary as desired by the user. Transportation may be arranged to and between participating venues using the app.

It is a further aspect of an example embodiment in the present disclosure to facilitate connection between individual users before, during, and after visiting participating venues. Accordingly, the app allows an individual user to send a drink to another individual user. The system tracks drink vouchers and their redemption, as well as allowing direct redemption by the drink recipient using the app. The app allows profiles of other individual users to be viewed, and allows friend requests and grouping of friends by preselected criteria.

It is yet a further aspect of an example embodiment in the present disclosure to facilitate ordering of drinks and food from the venue. Accordingly, drink and food choices may be provided to the individual user by the app. Once a drink or food item is selected by the individual user, a bar code is generated that may be provided to and scanned by a venue employee to facilitate ordering the item and providing it to the individual user.

Accordingly, the present disclosure describes a social networking system for organizing nighttime activities, for use by individual users when attending nighttime venues. A smartphone app may be provided for use by the individual users, for allowing users to create a profile, set venues to be attended, set a group of other individual users they will be attending with, set up payment, purchase drinks and send drinks to other individual users, arrange transportation to and from the venues, and communicate with other individual users.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

FIG. 6C is an elevational view, showing an example embodiment of an item list screen in accordance with the system of the present disclosure.

FIG. 6D is an elevational view, showing an example embodiment of a transaction detail screen in accordance with the system of the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

The present disclosure describes a system for allowing an individual user to interact with and arrange visits to a plurality of participating venues. Examples of such participating venues include, but are not limited to, bars, night clubs, pubs, live music venues, and the like. Management of such participating venues may provide another class of user known as venue users. The system may be implemented as an app, installed on an mobile electronic device such as a smartphone or tablet of the user(s), providing the functionality described herein using existing hardware as provided by the smartphone manufacturer. "Smartphone" as defined herein may refer to various portable/mobile electronic devices having voice communication, as well being programmable and having the ability to host applications that provide additional functionality, and a user interface that allows the user to access both the voice communication functionality and the additional functionality. The system is generally utilized by numerous individual users that each has an account and access the system by communicating with a server using their smartphone. Accordingly, when described herein, "the individual user", or "the user" generally is a first person reference to the individual user using the app, and "other individual users", "other users", or "another user", generally refers to other account holders on the system.

The following description provides an example embodiment of a user experience flow through the app by an individual user. Note that this example is non-limiting, and may be varied in part or in whole while adhering to the principles of the present disclosure.

Figure 1A:
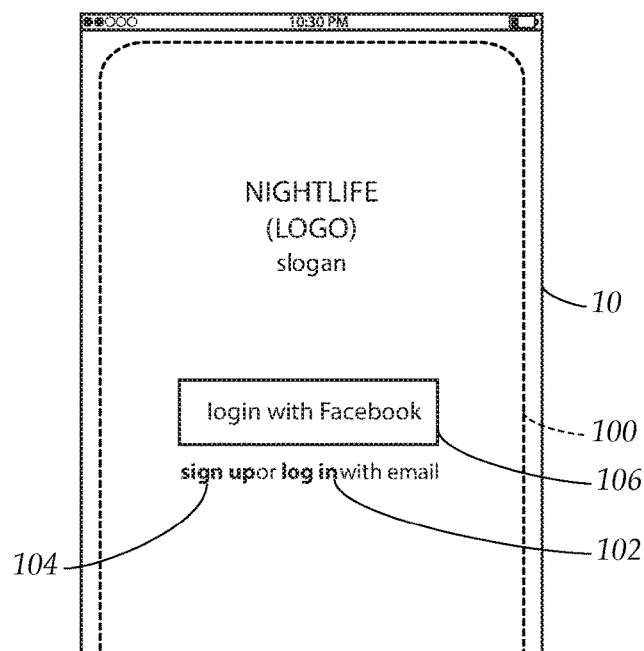
FIG. 1A is an elevational view, showing an example embodiment of a welcome screen of an app, displayed on a smartphone, in accordance with the system of the present disclosure.

Upon installation of the app onto the smartphone, the individual user is permitted to either create an account or access an existing account. FIG. 1A illustrates a welcome screen of the app 100, displayed on a smartphone touch screen 10, in accordance with the system of the present disclosure. The welcome screen 100 allows the user to choose to log in 102 or sign up 104. The user may also be given an authentication option 106, whereby another authenticated system, such as FACEBOOK, may be used to identify the user and associate the user with an existing account. Note that "displayed", "displaying", and "selecting", as recited herein, generally refers to the actions taken with, on, or by the smartphone touch screen of the individual user.

Figure 1B:
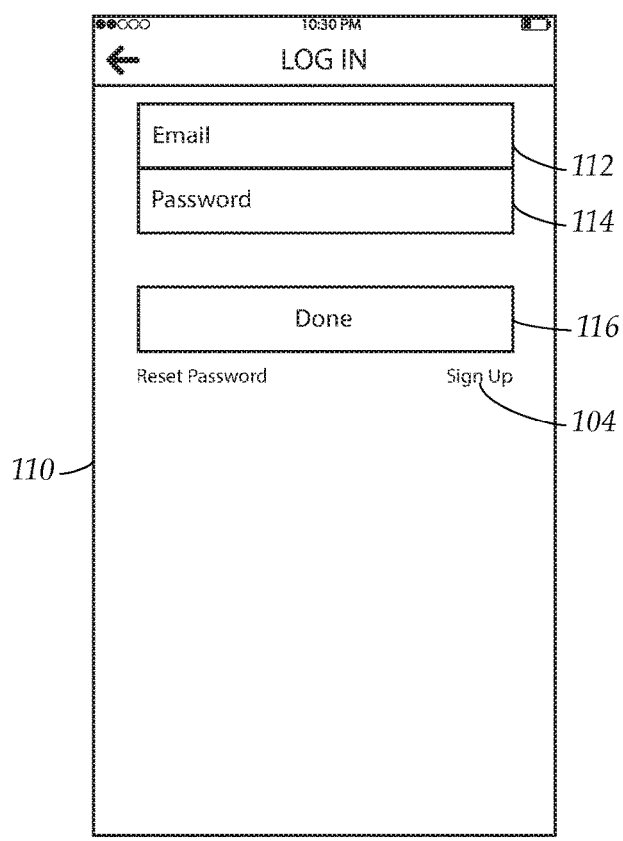
FIG. 1B is an elevational view, showing an example embodiment of a login screen of the app, in accordance with the system of the present disclosure.
Figure 1C:
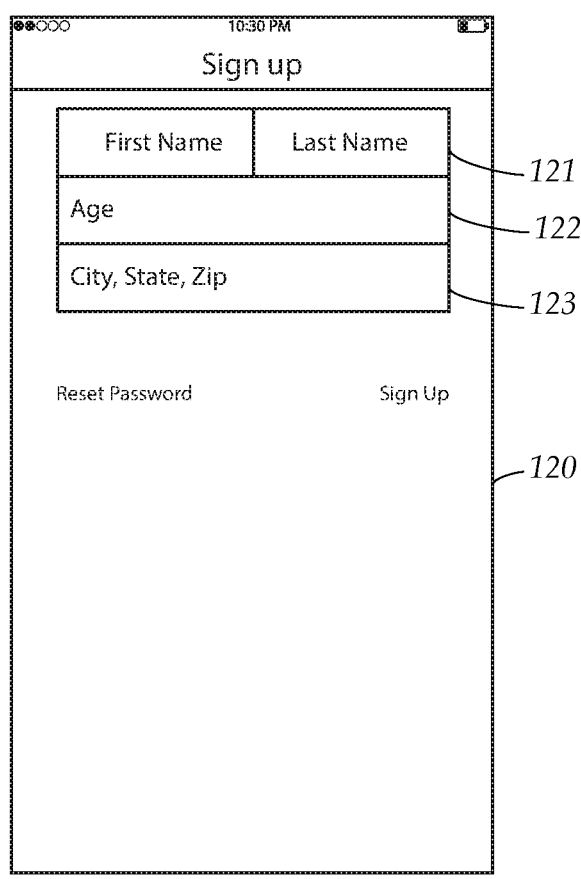
FIG. 1C is an elevational view, showing an example embodiment of a sign-up screen of the app, in accordance with the system of the present disclosure.

If the user selects log in 102, the user is directed to a login screen 110, as shown in FIG. 1B. The login screen 110 has an email field 112 and password field 114, both of which are fillable by the user prior to selecting a done button 116 to submit such login information to the server.

If the user selects sign up 104 on FIG. 1A or FIG. 1B, the user is directed to a sign up screen 120, as shown in FIG. 10. On the sign up screen 120, name 121, age 122, and address 123 of the user are requested to initiate creation of an account for that user.

Figure 2A:
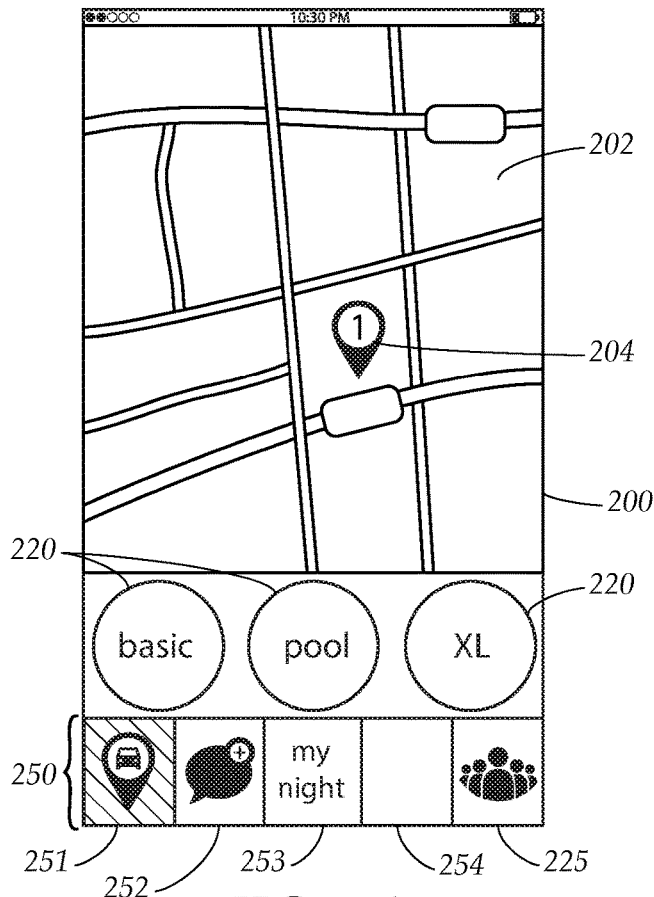
FIG. 2A is an elevational view, showing an example embodiment of a transportation selection screen of the app, in accordance with the system of the present disclosure.

The system may be configured to interface with a transportation module within the system or available externally from another provider. FIG. 2A illustrates a transportation selection screen 200 that includes a map 202 that visually indicates the user by a user location icon 204, as determined by the smartphone using existing GPS hardware that self-determines its location and provides GPS location data suitable for use by the app. The transportation selection screen 200 has service level icons 220, that allow the user to select from various transportation options, vehicles and service levels, such as basic or luxury cars, and shared ride arrangements.

Following selection of one of the service level icons 220, a transportation location screen 230 is displayed. On the transportation location screen 230, the user can arrange transportation to a selected venue by setting a pickup location and a drop-off location for a proposed trip. In particular, a set pickup button 231, and a set drop-off button 232 is provided. Upon selection of one of these buttons 231, 232 the user can designate the pickup location and drop-off location graphically or by entering an address or venue name into a text field. Note that once the transportation cost 281 is established, the user may opt to pay 282 or split 283 the transportation cost. If the user opts to split the cost by selecting the split icon 283, a crew list 284 is displayed, which includes the individual users that a part of a crew established by the individual user for the night as described in further detail hereinbelow. From the crew list 284, the user can choose which individual users will be splitting the transportation cost. The transportation cost will thereby be appropriately apportioned by the app for payment by the individual users. Whether the user opts to pay 282 or split 283 the transportation cost at the screen shown in FIG. 2C, FIG. 2D provides the opportunity for the user to set a tip amount 284, and provide feedback through rating stars 285 and text feedback 286.

Figure 2B:
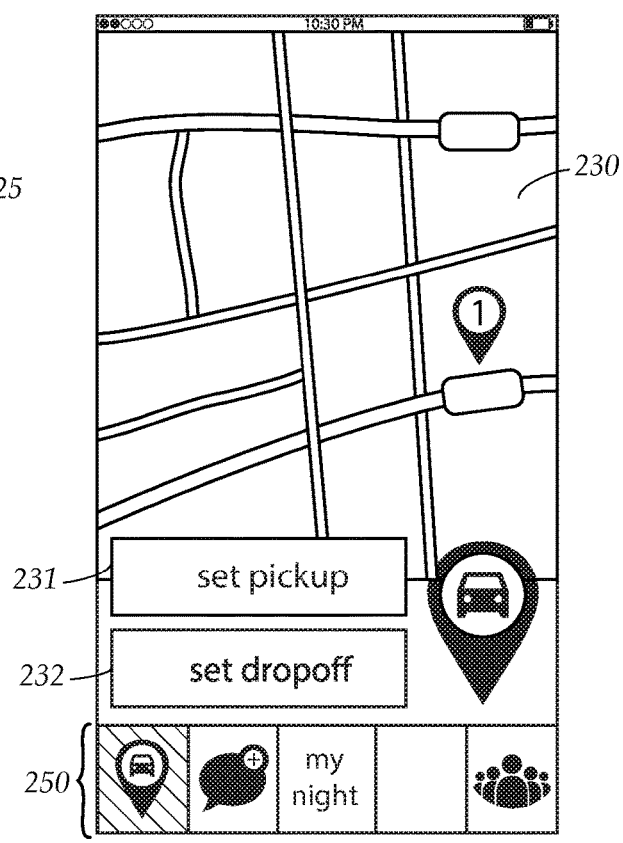
FIG. 2B is an elevational view, showing an example embodiment of a transportation location screen of the app, in accordance with the system of the present disclosure.
Figure 2C:
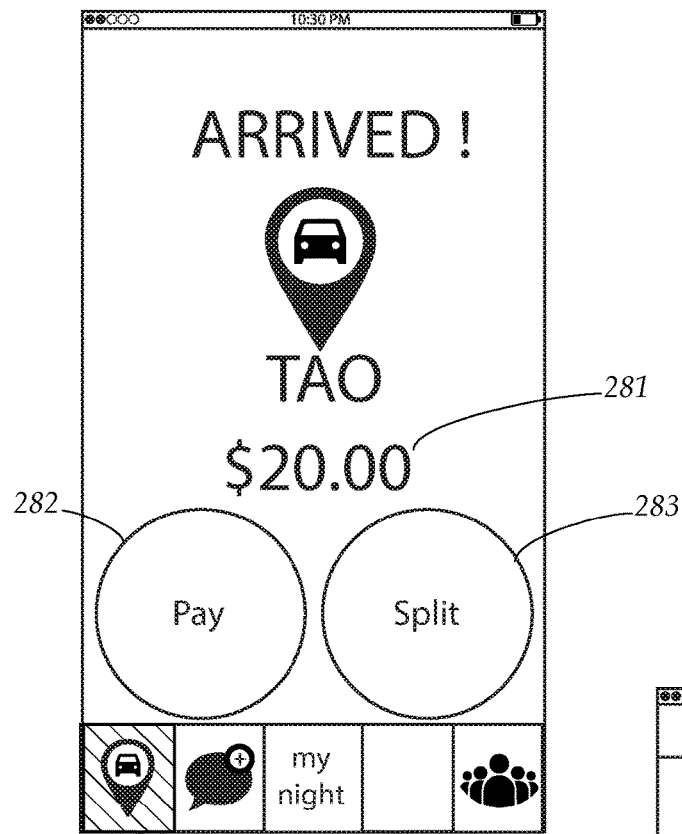
FIG. 2C is an elevational view, showing an example embodiment or a transportation completion screen of the app, in accordance with the system of the present disclosure.
Figure 2D:
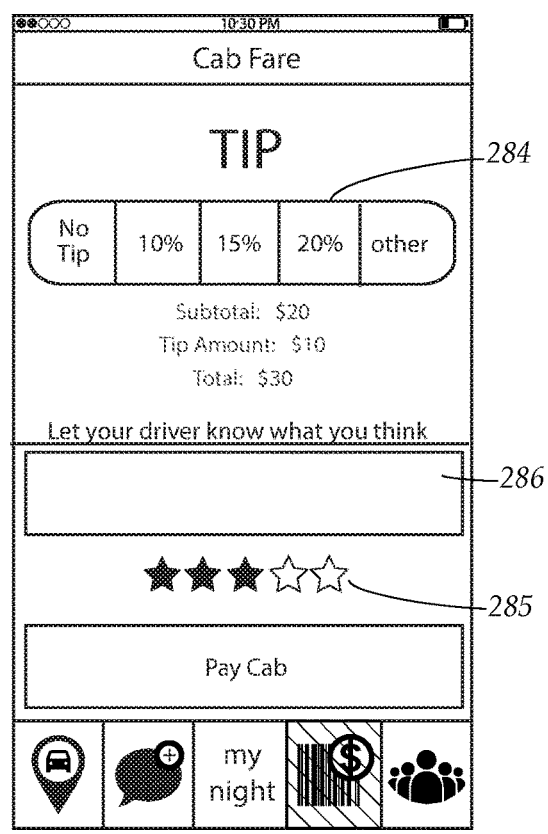
FIG. 2D is an elevational view, showing an example embodiment of a transportation payment screen of the app, in accordance with the system of the present disclosure.
Figure 2E:
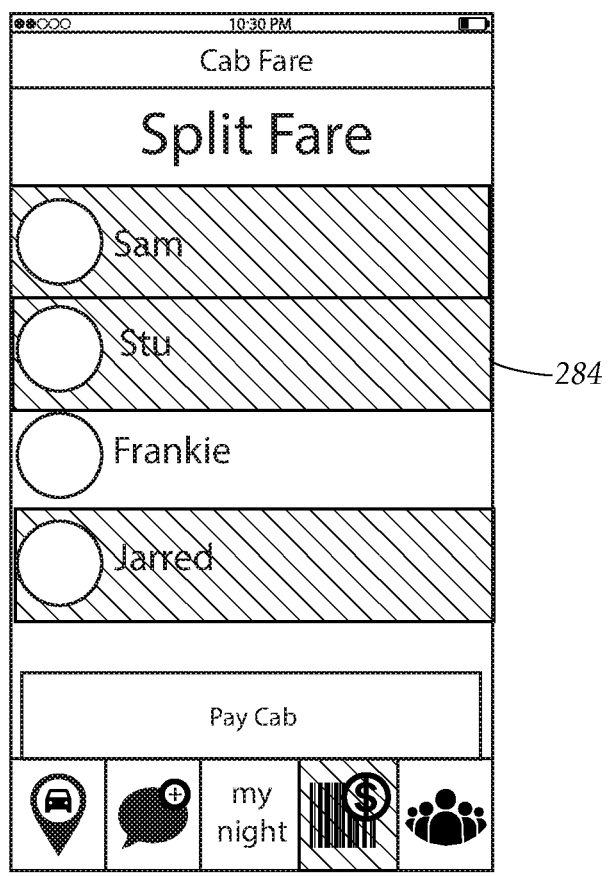
FIG. 2E is an elevational view, showing an example embodiment of a transportation payment split screen of the app, in accordance with the system of the present disclosure.

In FIG. 2A and FIG. 2B, a mode selection bar 250 is displayed. The mode selection bar 250 indicates various modes with individual icons that act as buttons to select that mode and also are highlighted, illuminated, or changed in color to indicate that they are currently active. For example, the mode selection bar includes a transportation icon 251, which is highlighted in FIGS. 2A and 2B. Accordingly, the transportation mode is active, which is clearly appropriate when the transportation selection screen 200 is displayed in FIG. 2A, and when the transportation location screen 230 is displayed in FIG. 2B. The other icons in the mode selection bar 250 include a chat icon 252, a night summary icon 253, a payment icon 254, and a profile icon 255.

Figure 3A:
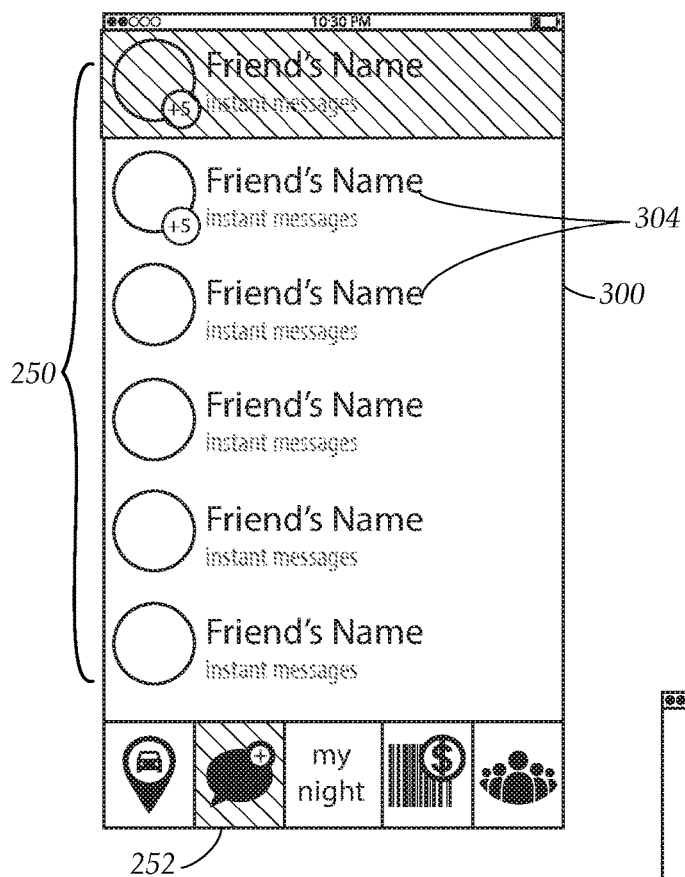
FIG. 3A is an elevational view, showing an example embodiment of a chat summary screen of the app, in accordance with the system of the present disclosure.
Figure 3B:
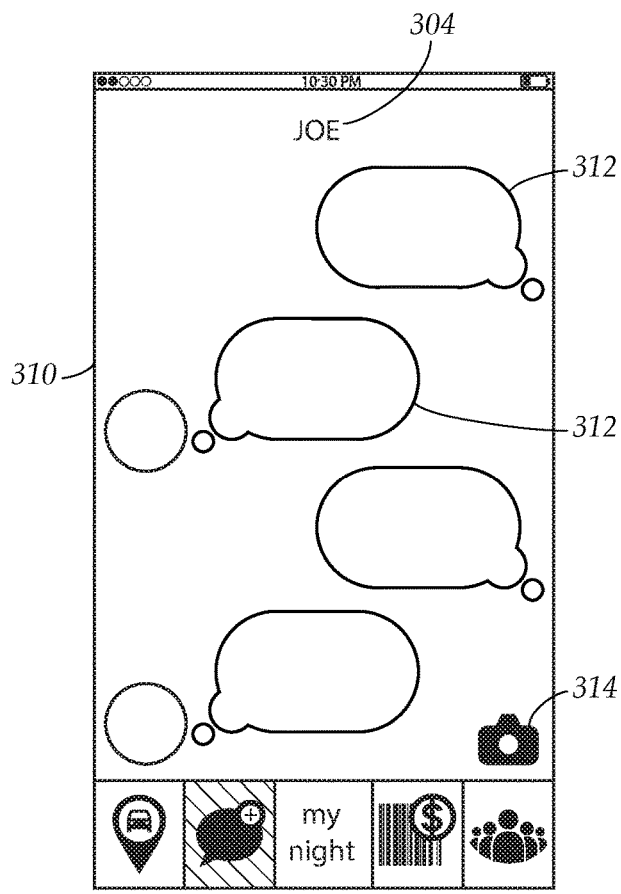
FIG. 3B is an elevational view, showing an example embodiment of a chat detail screen of the app, in accordance with the system of the present disclosure.

Referring now to FIG. 3A, when the chat icon 252 is selected, a chat mode is selected, and a chat summary screen 300 is displayed, upon which the chat icon 252 remains highlighted. On the chat summary screen 300, a friend list 302 is indicated, listing individual friends 304, and may preferably be a subset of those friends that have a previous chat history. Generally the friend list 302 is displayed on the chat summary screen 300 in reverse chronological order showing most recent chats first. When one of the individual friends 304 is selected by the user, a chat detail screen 310 is displayed (FIG. 3B), showing a plurality of individual chat messages 312 that reflect previous correspondence with the individual friend 304 indicated on the screen. A camera icon 314 may be provided to allow the chat to be enhanced with photos, videos, or other images that may be captured and subsequently communicated to others, including the individual friend 304 indicated thereon.

Figure 4A:
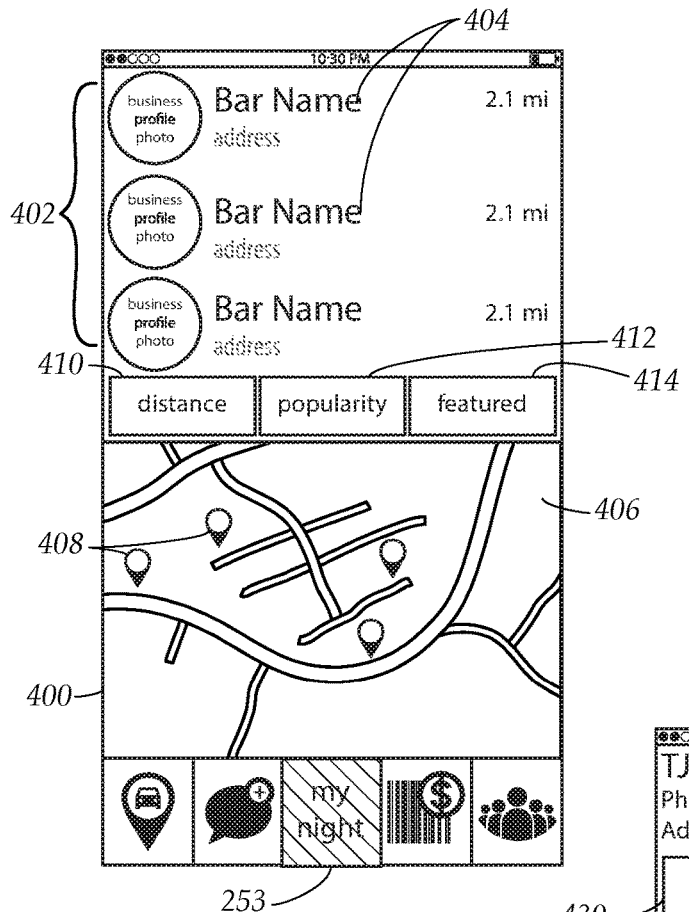
FIG. 4A is an elevational view, showing an example embodiment of a venue summary screen of the app, in accordance with the system of the present disclosure.

Referring now to FIG. 4A, when the night summary icon 253 is selected, a night summary mode is selected, and a venue selection screen 400 is displayed, upon which the night summary icon 253 remains highlighted. On the venue selection screen 400, a listing of venues 402 are displayed, consisting of several individual venues 404, along with associated distances, and a local map 406 that visually indicates venue locations 408 thereupon. The manner of sorting of the list can be selected by pressing/selecting icons for distance 410, popularity 412, and featured 414, that respectively indicate the user's preference for viewing venues by their relative distance to the user, by popularity among other users or employing any other criteria, or those which have been flagged by the system to be featured.

Figure 4B:
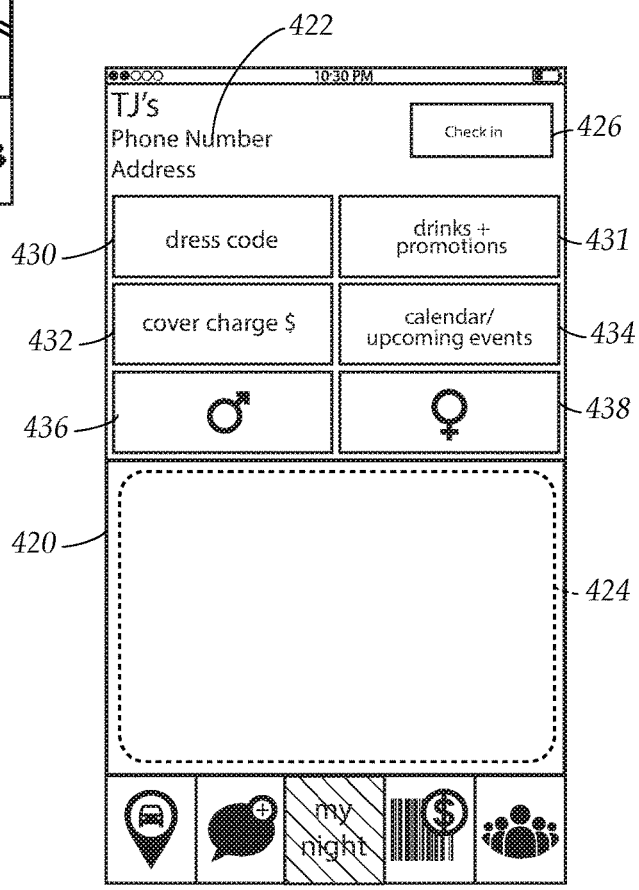
FIG. 4B is an elevational view, showing an example embodiment of a venue detail screen of the app, in accordance with the system of the present disclosure.
Figure 4C:
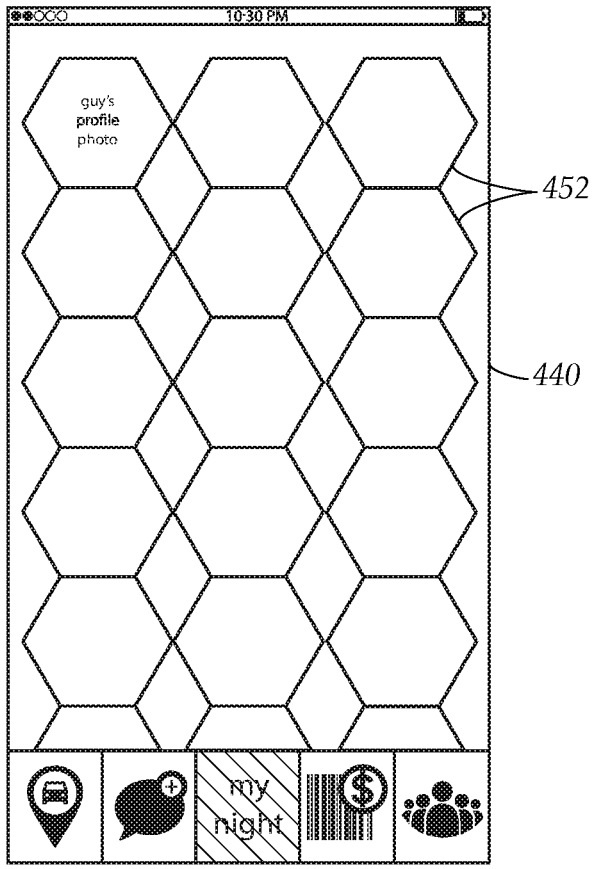
FIG. 4C is an elevational view, showing an example embodiment of a guy list screen of the app, in accordance with the system of the present disclosure.
Figure 4D:
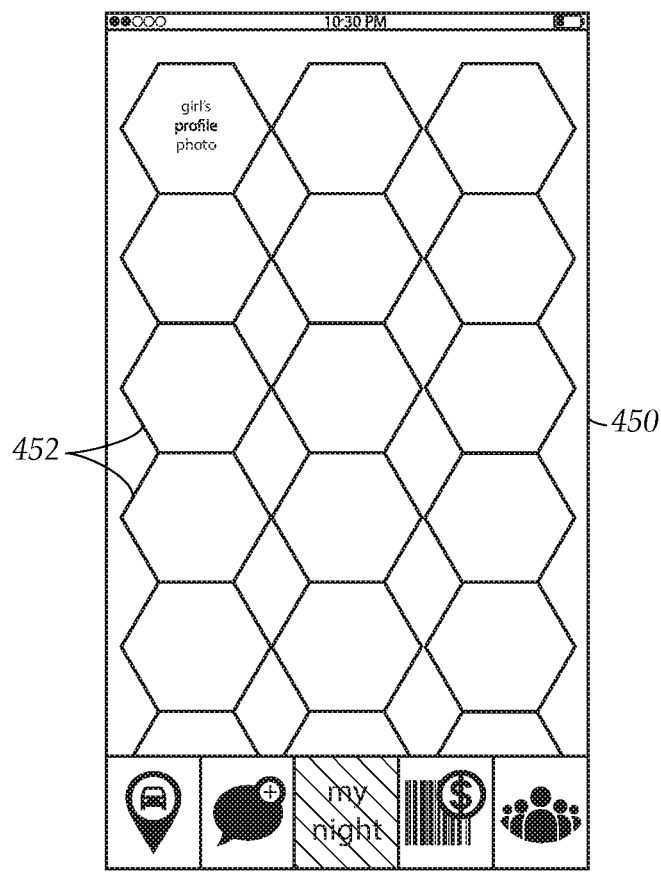
FIG. 4D is an elevational view, showing an example embodiment of a girl list screen of the app, in accordance with the system of the present disclosure.

When one of the individual venues 404 is selected, a venue detail screen 420 is displayed, as indicated by FIG. 4B. On the venue detail screen 420, locational information 422 about the venue 404 is displayed, as well as a venue image 424. A check in icon 426 is provided on the screen. When the check in icon 426 selected by the user, the user is permitted to check in at the venue such that the user's actual presence at the venue or intention to attend the venue that night is registered by the system. On the venue detail screen 420, the user can select icons to view information regarding dress code 430, drinks and promotions 431, cover charge 432, as well as a calendar of upcoming events 434. In addition, a guy list icon 436 and a girl list icon 438 are provided that allow the user to select a guy list screen 440 as shown in FIG. 4C, or a girl list screen 450 as shown in FIG. 4D, respectively. In FIGS. 4C and 4D, the guy list screen 440 and girl list screen 450 provide an array of profile icons 452. The profile icons 452 include a thumbnail photo that is representative of these other individual users. Selecting any of the profile icons 452 brings up a profile detail display 460 as seen in FIG. 4E.

Figure 4E:
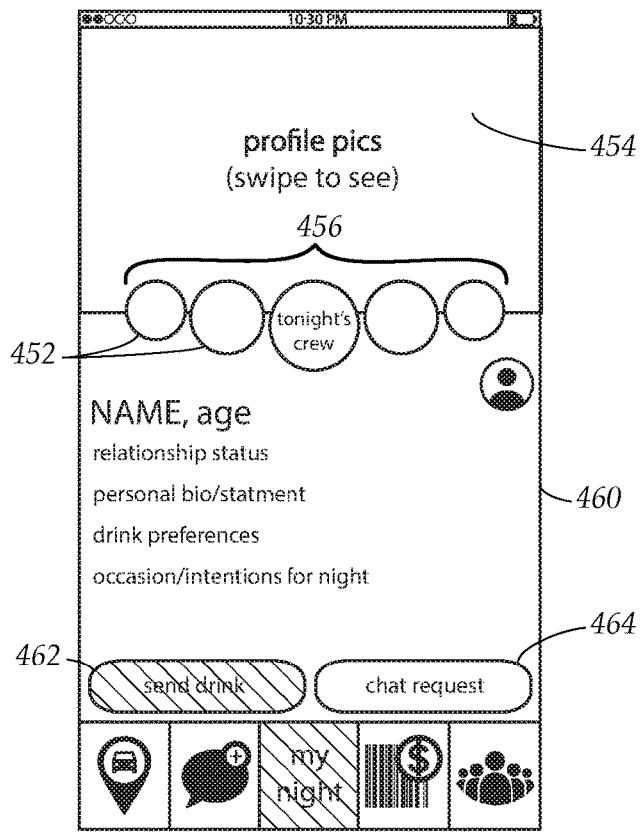
FIG. 4E is an elevational view, showing an example embodiment of a profile detail screen of the app, in accordance with the system of the present disclosure.

The profile detail display 460 in FIG. 4E includes biographical details, including relationship status, a personal bio statement, drink preferences of the user, as well as information regarding any special occasions or intentions for the night of that user. Near the top of the screen a profile photo 454 for that user is displayed, and additional profile photos of that user can be viewed by swiping to the side on the screen. In addition, profile icons 452 of people that are out with that user are displayed in a tonight's crew profile grouping 456, located beneath the profile photo 454. The tonight's crew profile grouping 456 may represent a plurality of individual users who have indicated that they are/will be together at the venue on a given night. The user can select the crew using the profile icons 452.

Figure 4F:
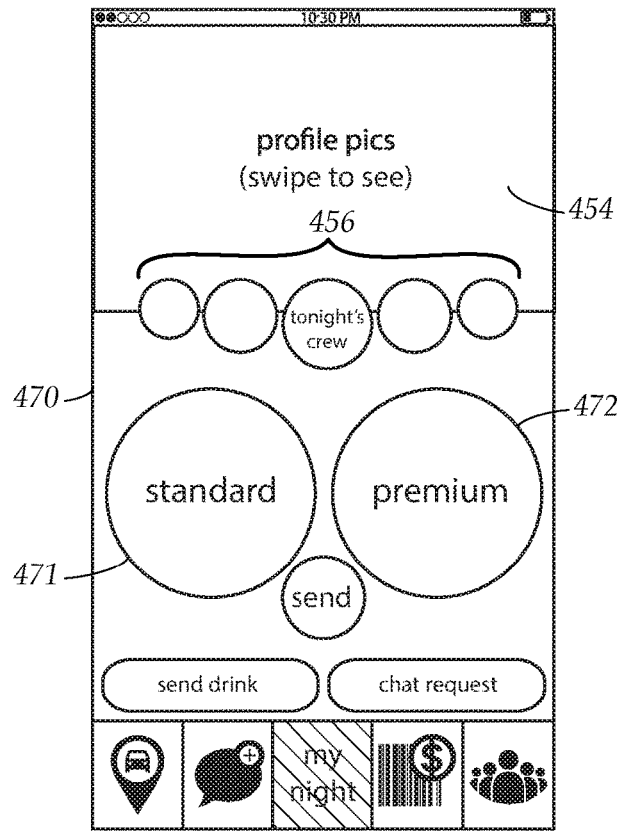
FIG. 4F is an elevational view, showing an example embodiment of the profile detail screen of FIG. 4E after the user has selected to send a drink, and options are provided to the user for doing so.

On the profile detail display 460, the user can opt to send a drink to the other user associated with that profile detail display 460. In particular a send drink icon 462 is provided on the profile detail display 460, as well as a chat request icon 464. Selecting the chat request icon 464 will bring up the chat detail screen 310 of FIG. 3B, to facilitate communicating with the other user. If the send drink icon 462 is selected, however, a drink request screen 470 is displayed (FIG. 4F), to allow the user to select options and send a drink to another user. The profile photo 454 for the other user and the tonight's crew profile grouping 456 will remain on the screen, but a standard icon 471 and a premium icon 472 are now displayed, and may be pressed by the user to choose a preference for the level/tier/expense of drink sent to that other user.

Figure 5A:
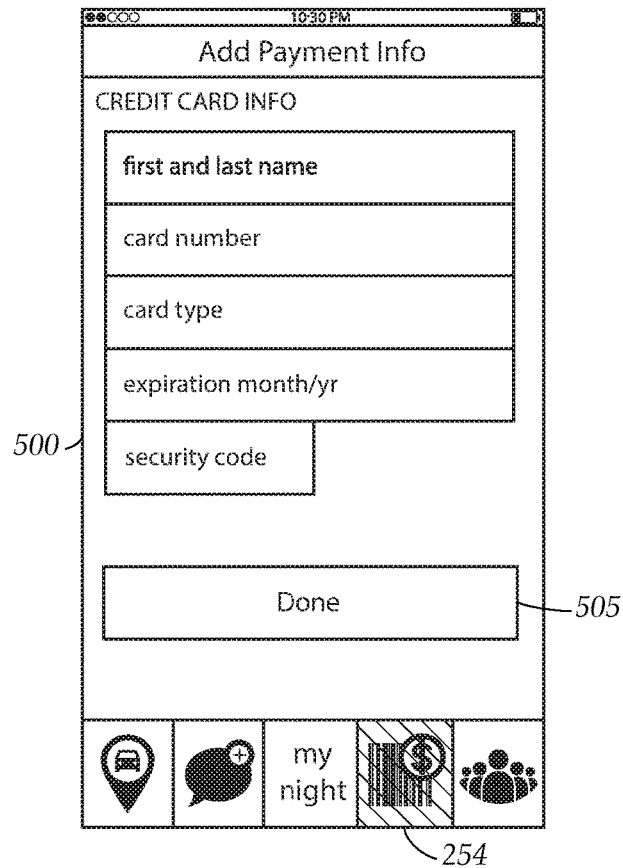
FIG. 5A is an elevational view, showing an example embodiment of a wallet configuration screen, in accordance with the system of the present disclosure.

Referring now to FIG. 5A, when the payment icon 254 is initially selected, a wallet configuration screen 500 is displayed. On the wallet configuration screen 500, the user is prompted to enter payment information, such as a credit card account number, expiration date, and security code. When suitable information is entered, the user may submit this information for storage on the system, by pressing a done button 505. Note that in a similar manner, ID information may be entered or an image thereof acquired, accessed, and stored on the system to provide proof of age to venues attended by the user. Subsequent to entering payment information, a payment selection screen 510 is displayed, upon which the payment icon 254 is highlighted. The payment selection screen 510 (FIG. 5B) provides icons to make a purchase 511, open or close a tab 512, and to redeem drinks 513. Referring to FIG. 5C, when the make a purchase icon 511 is selected, a purchase barcode display screen 520 (FIG. 5D) is shown, having a purchase barcode 522 which may be scanned at the venue to uniquely identify the user and take the requisite action. In particular, the purchase barcode 522 may be scanned by a bartender, wait staff, or other service personnel or employee of the venue, to allow purchase of food, drink, or other items by the user. Upon scanning the barcode 612, the purchase will be associated with a tab of the user. One of the employees of the venue will provide the purchased item to the user.

Figure 9:
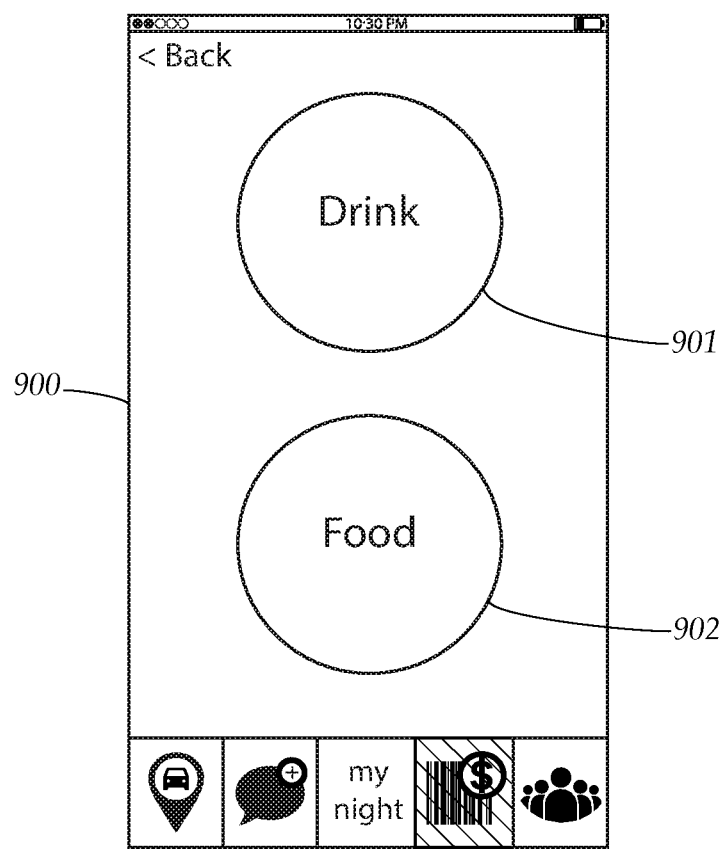
FIG. 9 is an elevational view, showing an example embodiment of a category selection screen in accordance with the system of the present disclosure.

FIG. 9 illustrates a further embodiment, wherein a category selection screen 900 provides the user with a drink icon 901 and a food icon 902 to elect picking a drink or food icon 902, respectively, for purchase.

Figure 10A:
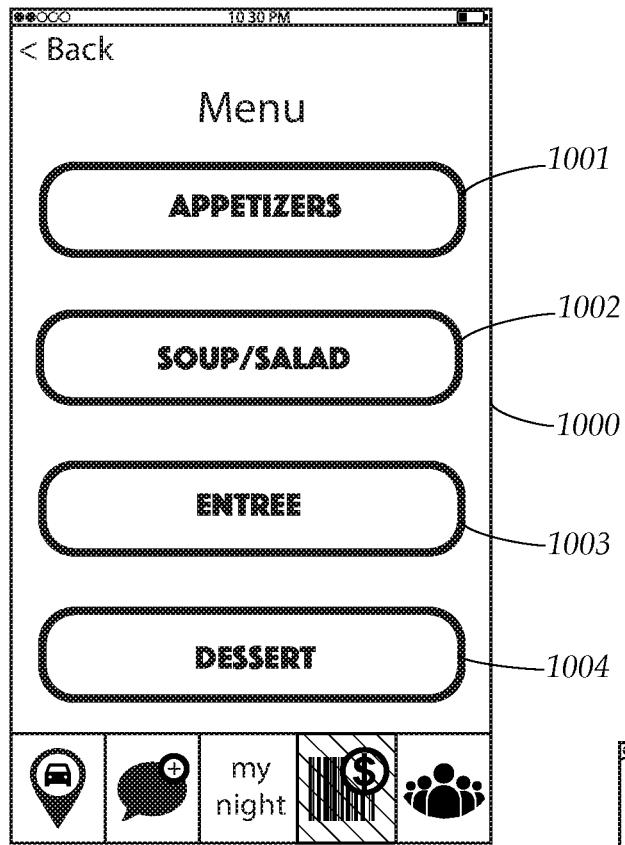
FIG. 10A is an elevational view, showing an example embodiment of a food type selection screen in accordance with the system of the present disclosure.
Figure 10B:
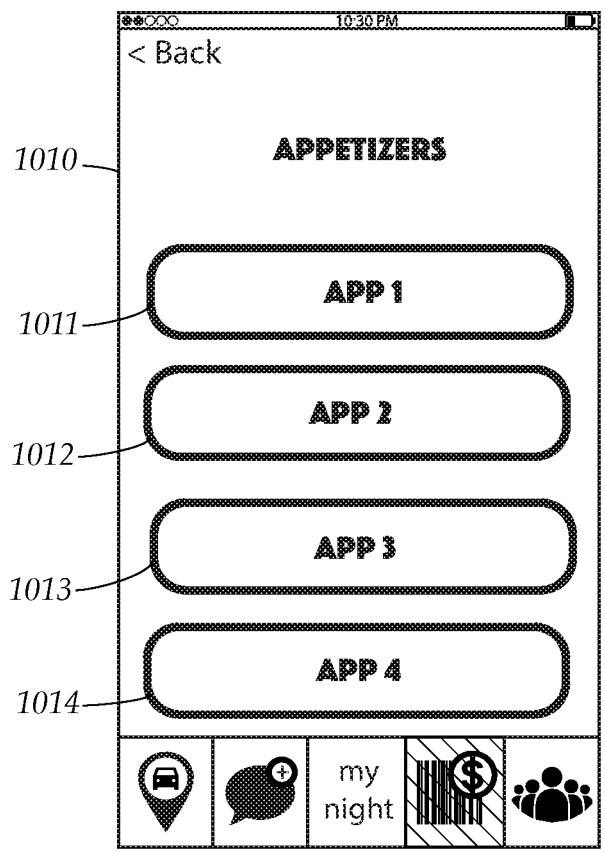
FIG. 10B is an elevational view, showing an example embodiment of an appetizer selection screen in accordance with the system of the present disclosure.
Figures 10C, 10D:
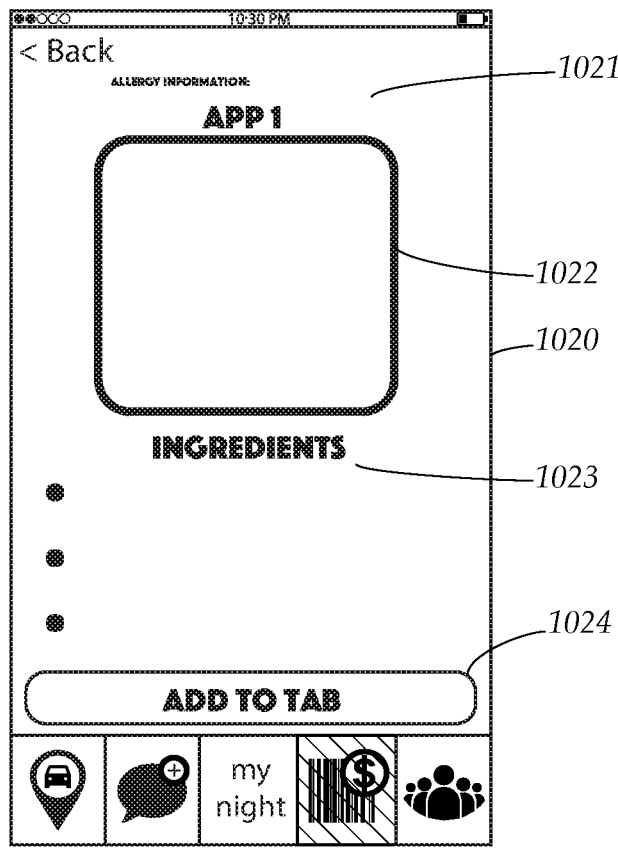
FIG. 10C is an elevational view, showing an example embodiment of a food item detail screen in accordance with the system of the present disclosure.
FIG. 10D is an elevational view, showing an example embodiment of a food tab list screen in accordance with the system of the present disclosure.
Figure 10E:
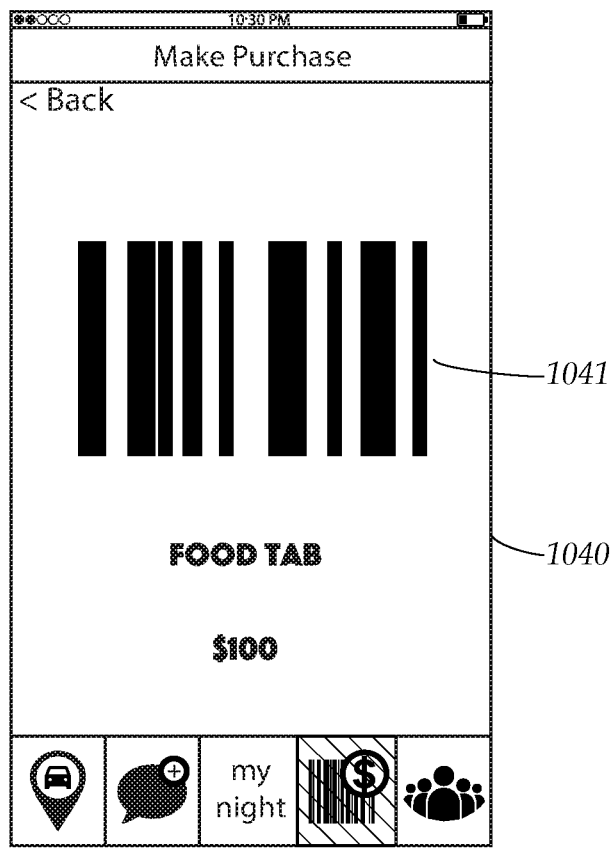
FIG. 10E is an elevational view, showing an example embodiment of a food tab barcode display screen in accordance with the system of the present disclosure.
Figure 10F:
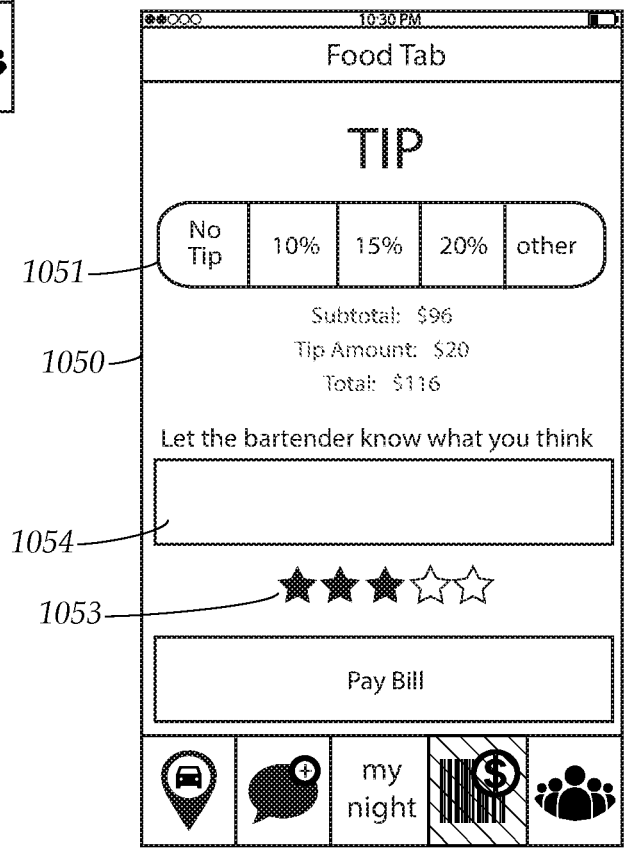
FIG. 10F is an elevational view, showing an example embodiment of a food tab payment screen in accordance with the system of the present disclosure.

If a food items is desired, the food icon 902 is pressed on the category selection screen 900 of FIG. 9, which then brings up a food type screen 1000 as shown in FIG. 10A. The food type screen 1000 provides options for selecting such food types as appetizers 1001, soup/salad 1002, entrée 1003, and dessert 1004. If, for example appetizers are selected using icon 1001 on the food type screen shown in FIG. 10A, an appetizer selection screen 1010 is displayed as shown in FIG. 10B. On the appetizer selection screen 1010, various choices for appetizers are provided, as indicated by icons APP1 1011, APP2 1012, APP3 1013, and APP4 1014. If, for example, APP 1 is selected by the user by pressing the icon for APP1 1011 on the screen shown in FIG. 10B, a food item detail screen 1020 is displayed as shown in FIG. 10C. The food item detail screen 1020 displays a name of the selected food item 1021, may provide an image of the selected food item 1022, and may also provide a list of ingredients for the selected food item 1023. If the user chooses to purchase this item, an add to tab button 1024 is provided. When the add to tab button 1024 is pressed on the screen shown in FIG. 10C, a food tab list 1030 is displayed as shown in FIG. 10D. On the food tab list 1030, various purchased food items 1031 are displayed, and the user is provided the option to close the tab 1032. If the user opts to close the tab, a food tab barcode display screen 1040 is displayed that includes the food tab barcode 1041. The food tab barcode 1041 may be scanned by personnel or employees of the venue to display the tab, accept payment, or take any other appropriate action, including ordering and delivering the items indicated on the food tab list 1030. When closing the food tab, a food tab payment screen 1050 provides a tip selection bar 1051 for allowing the user to select an appropriate tip as well as provide feedback through rating stars 1053 and text feedback 1054.

Figure 11A:
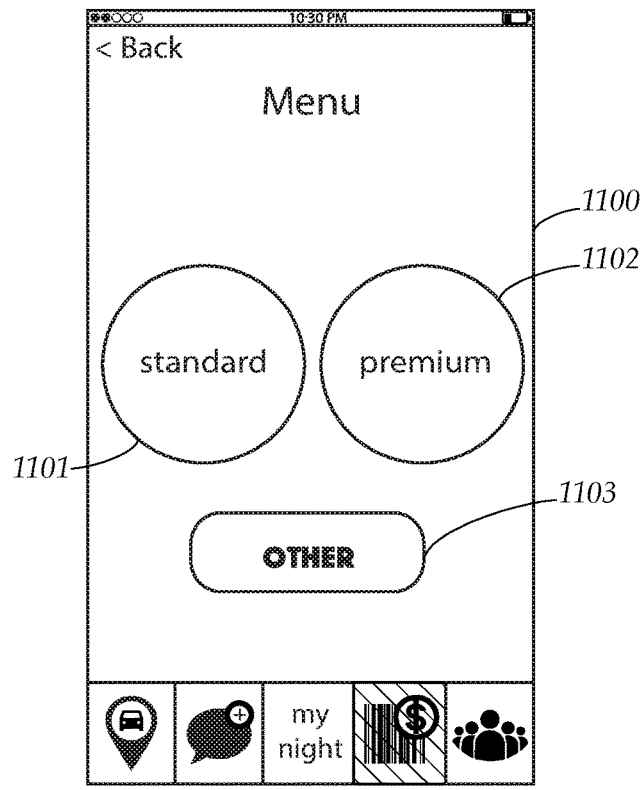
FIG. 11A is an elevational view, showing an example embodiment of a drink level selection screen in accordance with the system of the present disclosure.

If a drink item is desired, the drink icon 901 is pressed on the category selection screen 900 of FIG. 9, which then brings up a drink level screen 1100 as shown in FIG. 11A. The drink level screen 1100 provides options for standard 1101, premium 1102, and other drinks 1103. If other drinks 1103 is selected, options for various soft drinks are provided.

Figure 11B:
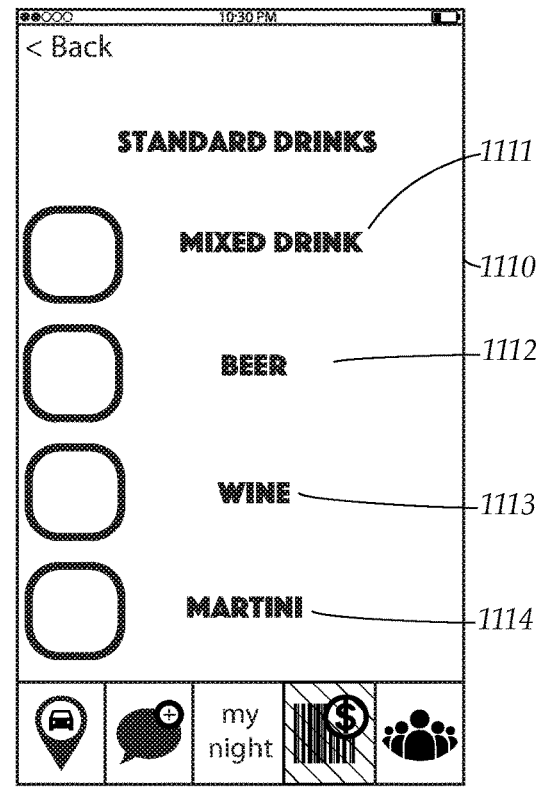
FIG. 11B is an elevational view, showing an example embodiment of a standard drink type selection screen in accordance with the system of the present disclosure.
Figure 11C:
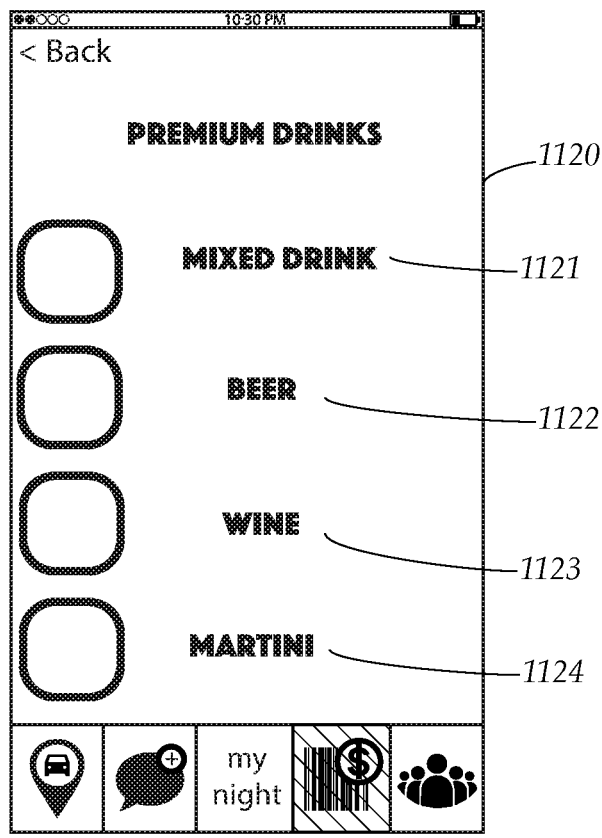
FIG. 11C is an elevational view, showing an example embodiment of a premium drink type screen in accordance with the system of the present disclosure.
Figure 11D:
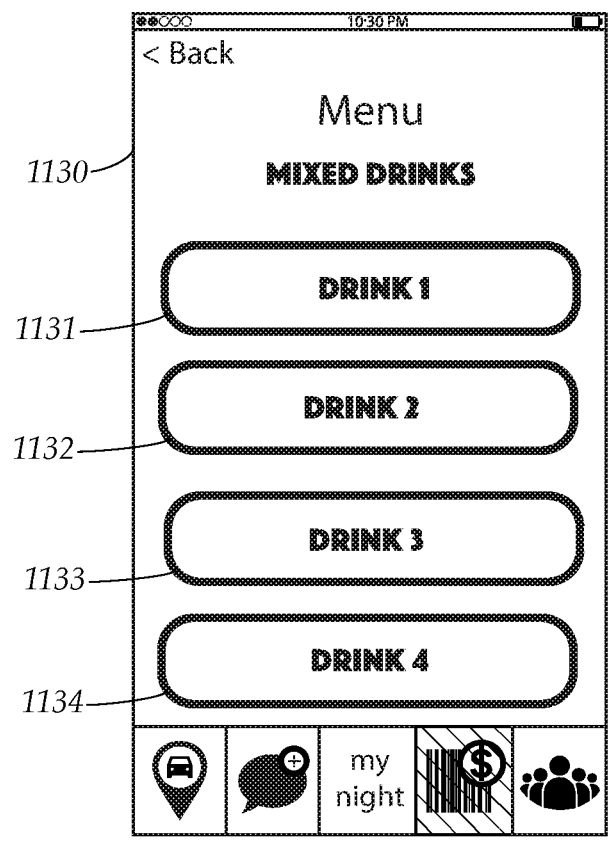
FIG. 11D is an elevational view, showing an example embodiment of a mixed drink selection screen in accordance with the system of the present disclosure.
Figure 11E:
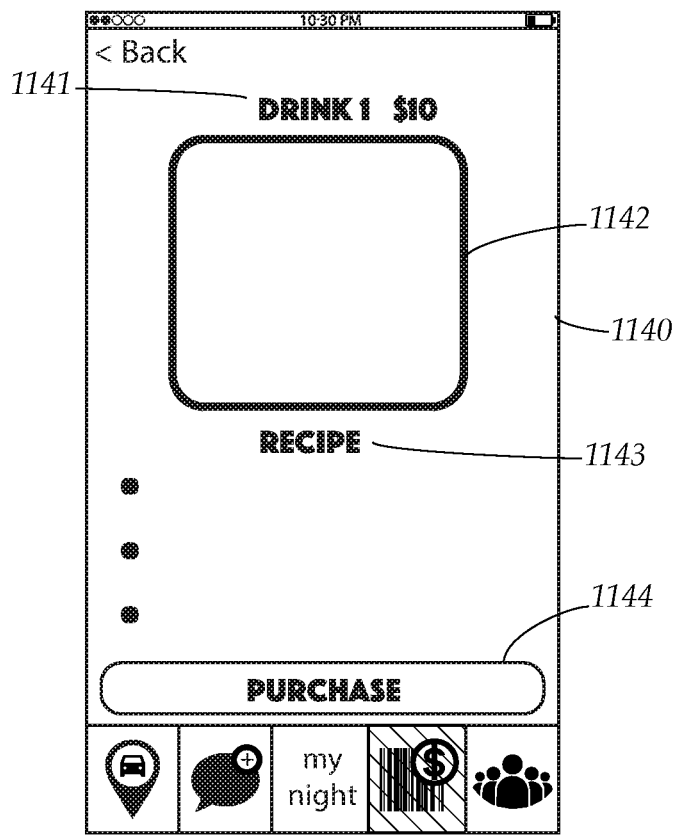
FIG. 11E is an elevational view, showing an example embodiment of a drink item detail screen in accordance with the system of the present disclosure.
Figure 11F:
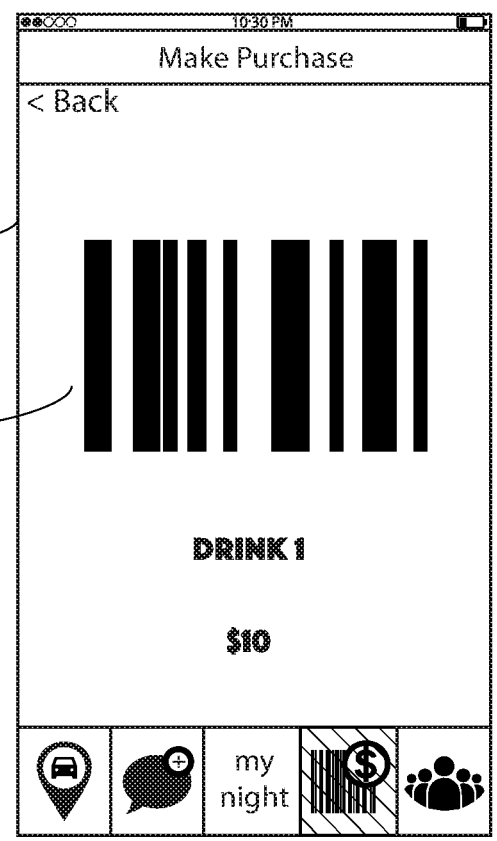
FIG. 11F is an elevational view, showing an example embodiment of a drink barcode display screen in accordance with the system of the present disclosure.

If the standard icon 1101 is pressed on the drink level screen 1100, the standard drink type screen 1110 is displayed on the mobile device as shown in FIG. 11B. The standard drink type screen 1110 provides options for selecting such drink types as mixed drinks 1111, beer 1112, wine 1113, and martinis 1114. Alternatively, if the premium icon 1102 is selected on the drink level screen 1100 as shown in FIG. 11A, the premium drink type screen 1120 is displayed as shown in FIG. 11C. The premium drink type screen 1120 also provides options for selecting such drink types as mixed drinks 1121, beer 1122, wine 1123, and martinis 1124. Regardless of whether from the premium drink type screen 1120 or the standard drink type screen 1110, once a drink type is selected—for example mixed drinks are selected using icon 1111 on the standard drink type screen 1110 of FIG. 11B or icon 1121 on the premium drink type screen 1120 of FIG. 11C—a mixed drink selection screen 1130 is displayed as shown in FIG. 11D. On the mixed drink selection screen 11130, various choices for mixed drinks are provided, as indicated by icons DRINK1 1131, DRINK2 1132, DRINK3 1133, and DRINK4 1134. If, for example, DRINK1 is selected by the user by pressing the icon for DRINK1 1131 on the screen shown in FIG. 11D, a drink item detail screen 1140 is displayed as shown in FIG. 11E. The drink item detail screen 1140 displays a name of the selected drink item 1141, may provide an image of the selected drink item 1142, and may also provide a recipe 1143 for the selected drink item. If the user chooses to purchase this item, a purchase icon 1144 is provided. When the purchase button 1144 is pressed on the screen shown in FIG. 11E, a drink barcode display screen 1150 is displayed on the mobile device as shown in FIG. 11F. The drink barcode display screen 1150 includes a drink barcode 1151. The drink barcode 1151 may be scanned by personnel or employees of the venue to order the drink for the user, accept payment, or take any other appropriate action, including ordering and delivering the drink 1051 indicated by the drink barcode 1151 to the user.

Figure 5B:
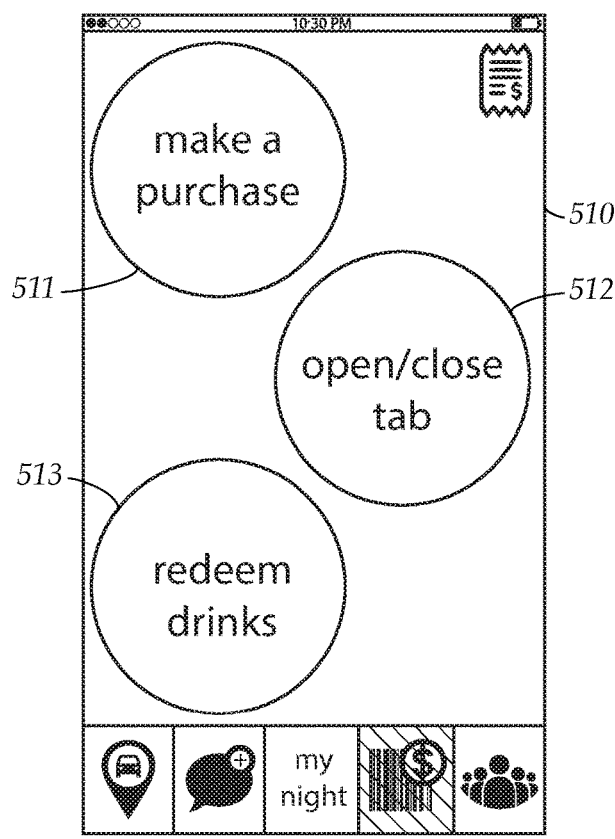
FIG. 5B is an elevational view, showing an example embodiment of a payment selection screen, in accordance with the system of the present disclosure.
Figure 5C:
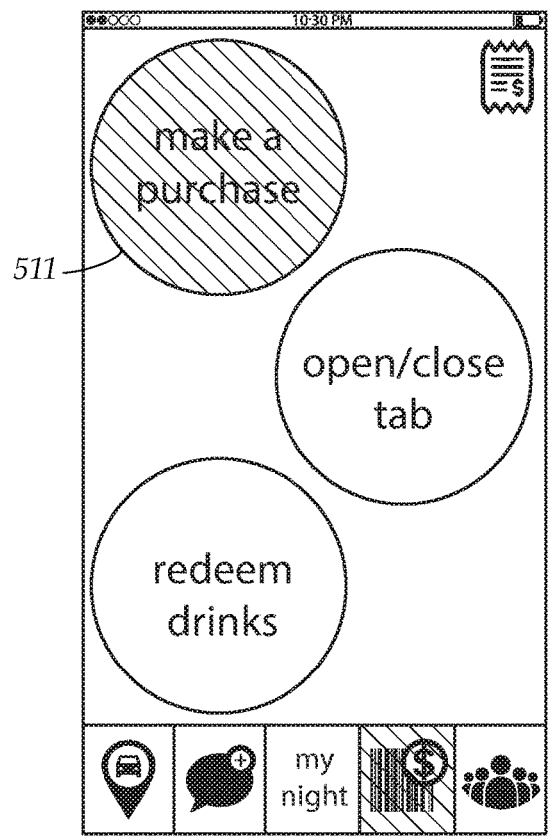
FIG. 5C is an elevational view, showing an example embodiment of the payment selection screen of FIG. 5B, wherein the "make a purchase" icon has been selected, in accordance with the system of the present disclosure.
Figure 5D:
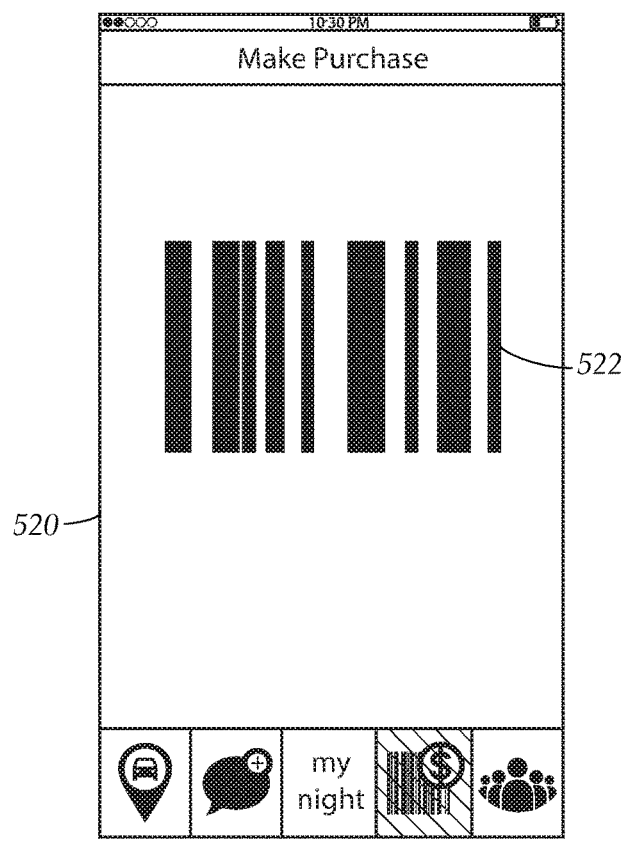
FIG. 5D is an elevational view, showing an example embodiment of a purchase barcode display screen, which may be offered at a venue to make a purchase in accordance with the system of the present disclosure.
Figure 6A:
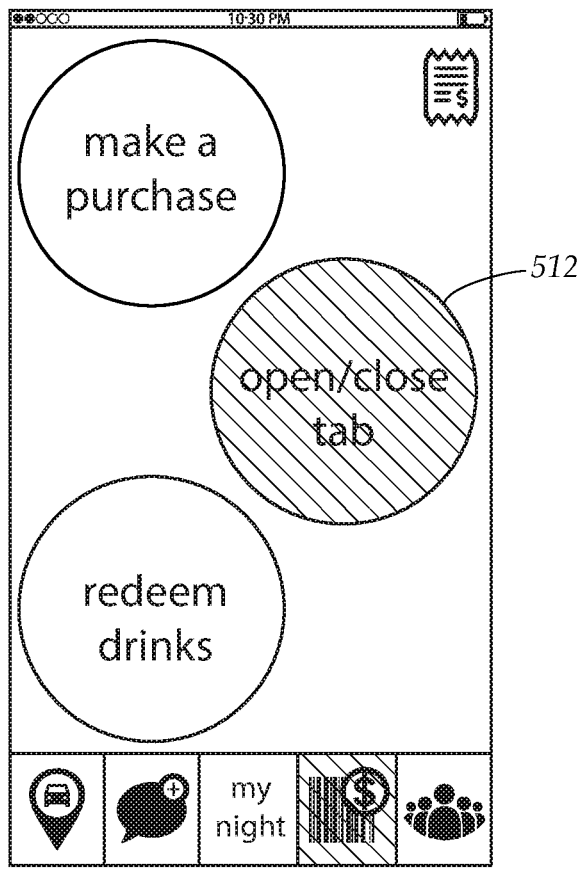
FIG. 6A is an elevational view, showing an example embodiment of the payment selection screen of FIG. 5B, wherein the "open/close tab" icon has been selected, in accordance with the system of the present disclosure.
Figure 6B:
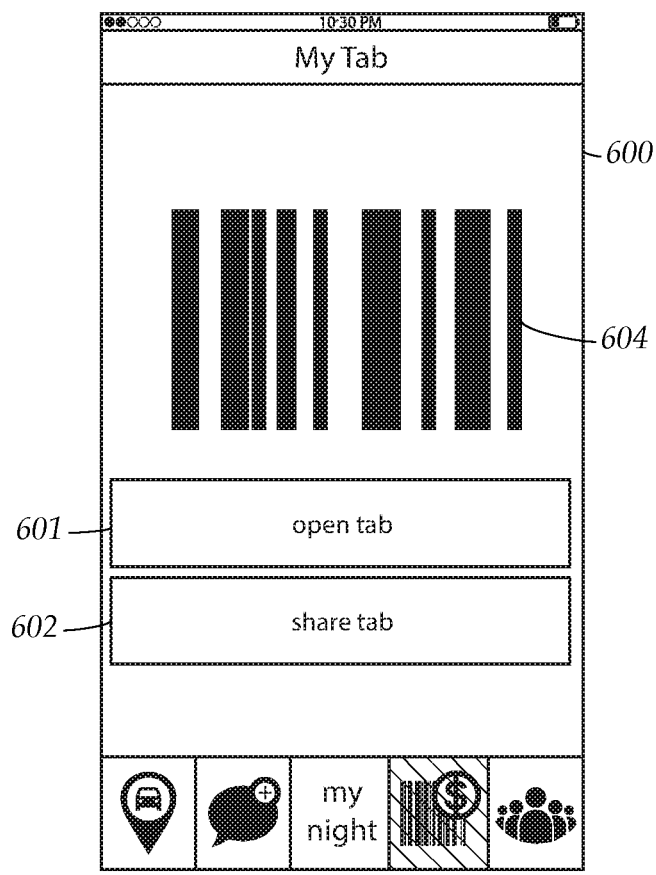
FIG. 6B is an elevational view, showing an example embodiment of a tab barcode display screen, which may be offered at a venue to identify the individual user and allow the user to open or close a tab in accordance with the system of the present disclosure.
Figure 6E:
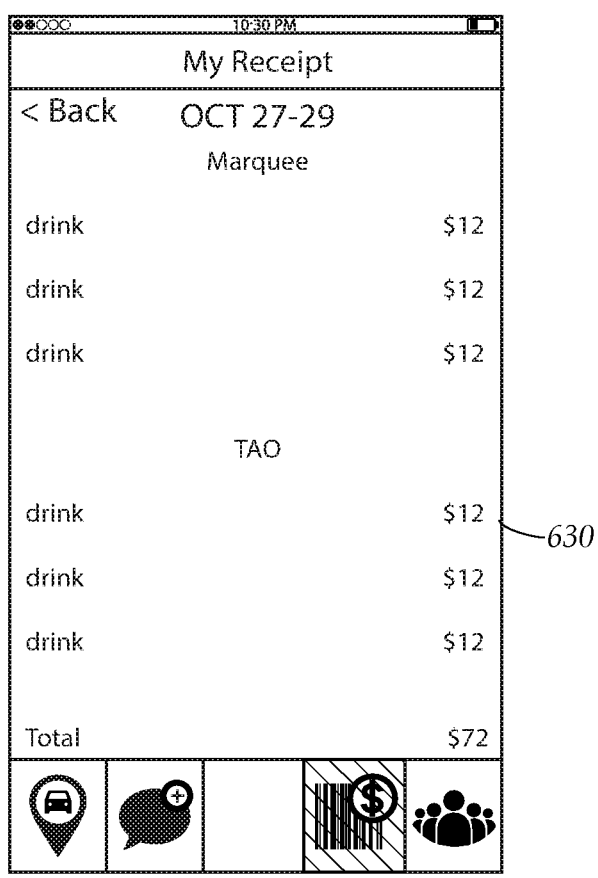
FIG. 6E is an elevational view, showing an example embodiment of a receipt screen, in accordance with the system of the present disclosure.

FIG. 6A again shows the payment selection screen 510, similar to FIG. 5B, except wherein the open or close tab icon 512 is highlighted, indicating that the user has selected this option. Accordingly, the user is directed to a tab barcode display screen 600, as shown in FIG. 6B. On the tab barcode display screen 600, the user is given the option to open a tab 601, to share the tab 602, and a tab barcode 604 is displayed, allowing venue personnel to scan the barcode 604 and access the user's tab within the system. FIG. 6C provides a tab detail screen 610, which provides a list of individual items 612 on the tab of the user, as well as a current total 614. A close tab 616 icon is provided to allow the user to close the tab. When selected by the user, the close tab 616 icon brings the user to a transaction detail page 620, as shown in FIG. 6D. The transaction detail page 620, provides a tip selection bar 622, where the user can choose one of several predetermined percentage amounts to add to the tab as a tip, as well as a custom amount, or to leave no tip. In addition, a feedback field 624, and rating bar 626 allow the user to provide reviews and rating to the system. When all information and options are set according to the user's preferences and expectations, a pay tab button 628 is pressed by the user to complete the transaction. A receipt screen 630 provides a receipt to the user that may be screenshot and saved by the user. As indicated, the receipt screen 630 may provided an itemized receipt for multiple venues visited during the night.

Figure 7A:
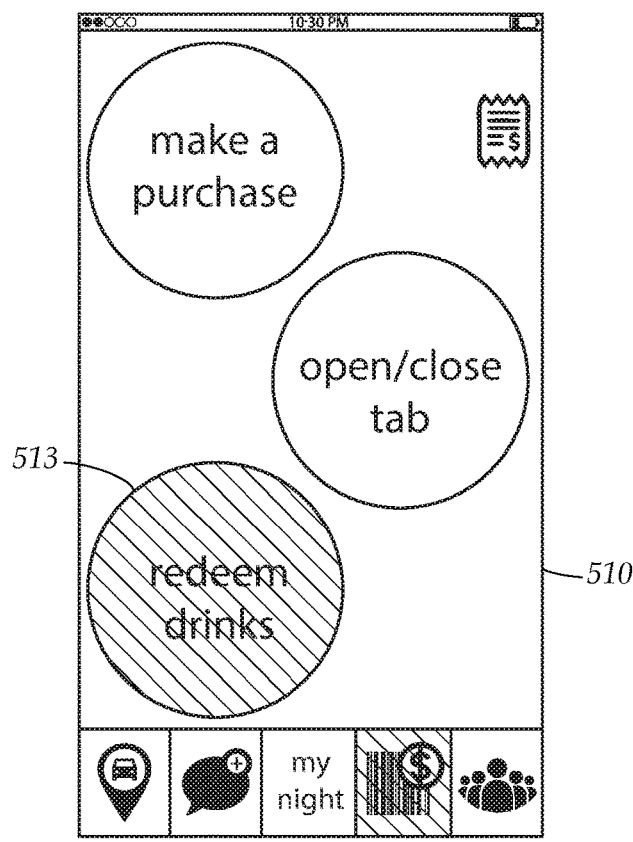
FIG. 7A is an elevational view, showing an example embodiment of the payment selection screen of FIG. 5B, wherein the "redeem drinks" icon has been selected, in accordance with the system of the present disclosure.
Figure 7B:
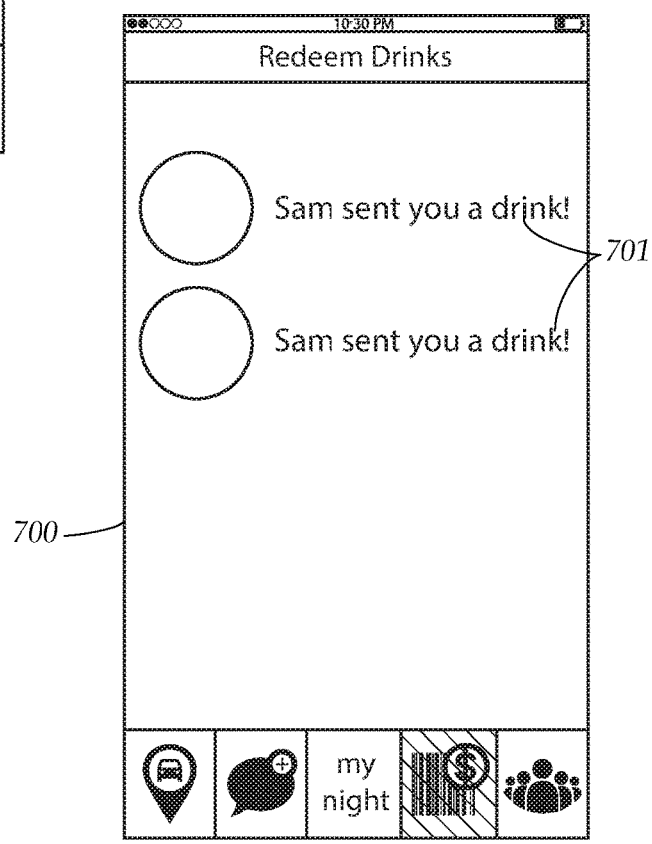
FIG. 7B is an elevational view, showing an example embodiment of a received drink list screen in accordance with the system of the present disclosure.
Figure 7C:
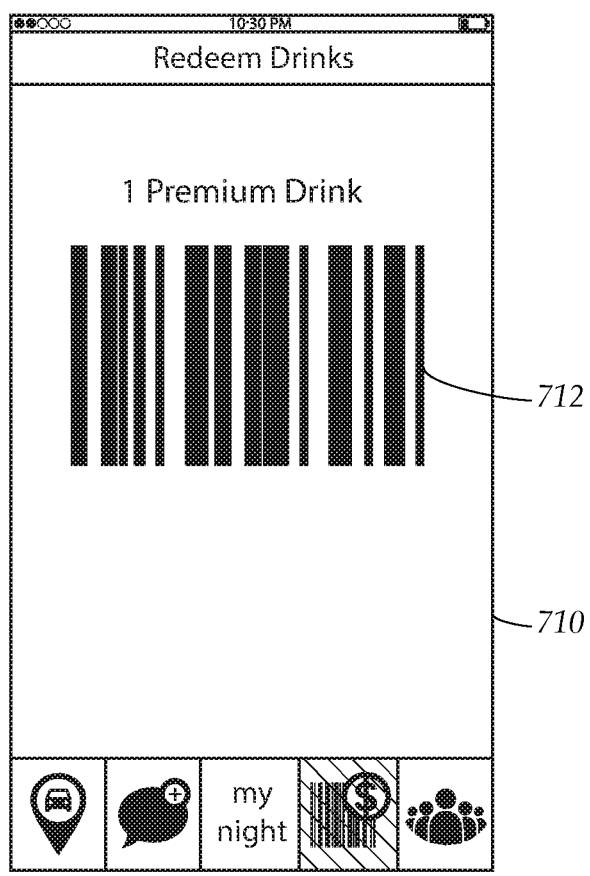
FIG. 7C is an elevational view, showing an example embodiment of a drink redemption barcode display screen in accordance with the system of the present disclosure.

FIG. 7A again shows the payment selection screen 510, similar to FIGS. 5B and 6A, except wherein the redeem drinks icon 513 is highlighted, indicating that the user has selected to view and redeem drinks sent by an other user. Upon selection of the redeem drinks icon 513, the user is brought to a received drink list screen 700 as shown in FIG. 7B, whereupon a list of received drinks 701 is provided. The user can select any of the received drinks 701, by pressing the icon associated therewith, and will be brought to a redemption barcode display screen 710, as shown in FIG. 7C. On the redemption barcode display screen 710, a drink redemption barcode 712 is displayed, along with an indication of the type of drink allowed, e.g. "1 Premium Drink". Upon ordering a drink from venue personnel, the drink redemption barcode 712 is scanned and registered on the system. At this point, preferably the user who sent the drink is notified that their previously sent drink has been redeemed by the other user.

Figure 8A:
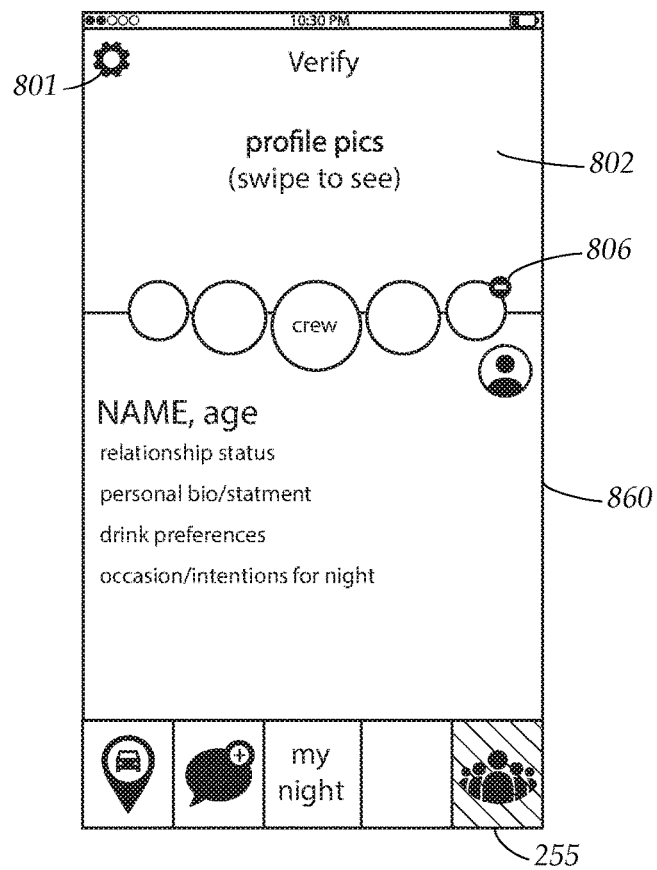
FIG. 8A is an elevational view, showing an example embodiment of a user profile screen in accordance with the system of the present disclosure.
Figure 8B:
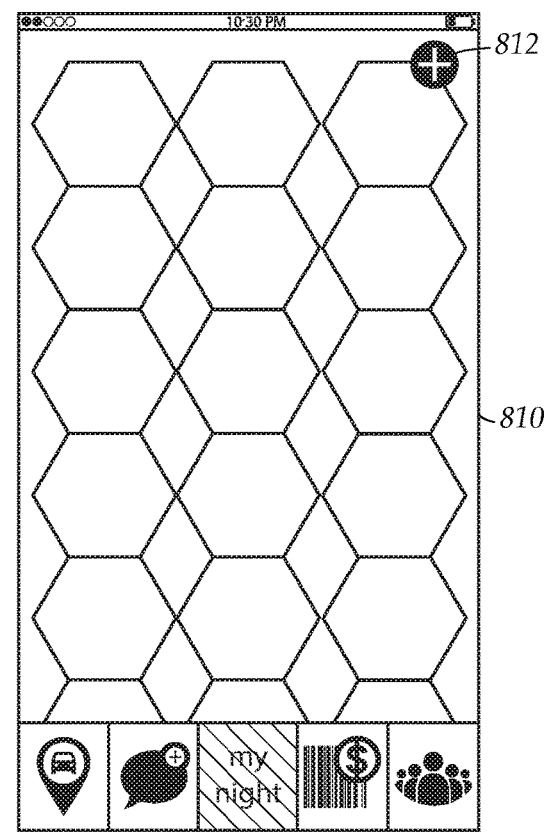
FIG. 8B is an elevational view, showing an example embodiment of a friend list screen in accordance with the system of the present disclosure.

Referring to FIG. 8A, when the profile icon 255 is selected, a profile mode is entered and a user profile screen 800 is displayed. The user profile screen displays information about the user that is made available to other users. In particular, the user profile detail display 800 displays public information presented about the user, such as biographical details, including relationship status, a personal bio statement, drink preferences of the user, as well as information regarding any special occasions or intentions for the night of that user. Such information may be set or altered by the user, for example, by selecting a profile settings icon 801. Near the top of the screen a profile photo 802 for the user is displayed, and additional profile photos of the user can be viewed by swiping to the side on the screen. Advantageously, additional photos can be taken and designated as "tonight's photos", to allow others to easily identify the user as he or she looks on that night. In addition, profile icons 803 of people that are out with the user are displayed in a user crew grouping 804, located beneath the user profile photo 802. The user crew grouping 804 may represent a plurality of individual users who have indicated that they are/will be together at the venue on a given night. A remove icon 804 is provided to allow the user to remove other users from the user crew grouping 804. The user can also add friends to the user crew grouping 805 by selecting them on a friend list screen 810 (seen in FIG. 8B). On the friend list screen 810, other user profiles are displayed, and may be added to the user crew grouping by selecting an add icon 812.

In addition to the functionality described hereinabove, which is oriented toward individual users, the system may provide additional management functionality to venue users. Such functionality may include configuration of venue information, data, and features and items for purchase available to individual users, upcoming events, cover charge, specials and promotions. Such functionality may also include access to tabulations and reports of individual activity with respect to the venue to better understand wants and needs of clientele, as well as information that helps better manage the day-to-day operations of the venue. Accordingly, venue users are provided access to the system and are given additional information and data to fulfill their needs for the system. Venue users may be provided access to the system through a mobile app, through a web based portal, or through a personal computer based software application. Among the data, information, and features that may be provided to venue users may include the types of drinks purchased, quantity of drinks purchased, which bartender served, the drinks sent and received, who sent drinks, promotions sent through the establishment, verification that users used the transportation services provided by the app, number of customers, gender of users and other user information, lists of user transactions, lists of all transactions, data regarding who purchases drinks and total spent, which drinks are the most popular, etc.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The user flow depicted in the diagrams provide just one example. There may be many variations to these diagrams or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented a social networking system for organizing nighttime activities. The disclosure is illustrated by example in the drawing figures, and throughout the written description. It should be understood that numerous variations are possible, while adhering to the inventive concept. Such variations are contemplated as being a part of the present disclosure.

What is claimed is:

1. A social networking method for organizing nighttime activities, for use by a plurality of users each with a mobile device having a touchscreen and running a mobile app, the mobile app being configured with a mode selection bar configured to persistently display a plurality of individual buttons as icons in a portion of the touchscreen during dynamic displays of different modes accessed by selecting the icons, the mode selection bar including a night summary icon for selecting a night summary mode and a payment icon for selecting a payment mode, the method comprising the steps of:

presenting the mode selection bar including the night summary icon on a persistent display portion of the touchscreen display interface of the mobile device, wherein the mobile app is configured to persistently display the mode selection bar and dynamically display a plurality different modes accessed by selecting the icons in another portion of the touchscreen display;

in response to the user pressing the night summary icon to select the night summary mode, the mobile app launches an interactive venue selection screen in the other portion of the touchscreen; the venue selection screen including a listing of venues, the listing of venues including a plurality of individual venues on the venue selection screen along with distances to said individual venues and a display of a local map with the individual venues visually indicated thereon;

in response to the user selecting one of the individual venues from the listing of venues from the venue selection screen from the other portion of the mobile device touchscreen, the mobile app launches an interactive friend list screen comprising a list of other individual user profiles of the mobile app who are associated with the user in the other portion of the touchscreen;

creating a crew of individuals by the user by selecting at least one of the other listed individual user profiles within the interactive friend list in the other portion of the touchscreen;

displaying in the other portion of the touchscreen a user list by the mobile app comprising a list of the selected profiles, each profile being associated with an individual user of the app present at the selected venue;

in response to the user pressing the profile to select one of the profiles in the user list by the user via the mobile app, the mobile app launches a display of a crew profile grouping comprising other individual user profiles associated with the selected profile in the other portion of the touchscreen;

in response to the user pressing the payment icon from the mode selection bar in the persistent display portion of the touchscreen display to select the payment mode, the mobile app launches a display of an interactive screen for selecting an item of food or drink in the other portion of the touchscreen display, providing an icon for selecting an item of food or drink to purchase from the selected venue from the interactive screen for selecting an item of food or drink in the other portion of the touchscreen;

providing a send icon for sending the item to the individual user associated with the selected profile by the user, said individual user corresponding to a recipient, and in response to the user sending the item to the recipient, the mobile app of the recipient adds the item to a received items list for the recipient;

in response to the recipient selecting the item from a display of the received items list of the touchscreen display of the mobile device of the recipient, the same mobile app of the recipient generates a redemption barcode for display in the other portion of the touchscreen display of the mobile device of the recipient, the redemption barcode identifying the item and the recipient;

redeeming the item by scanning the display of the redemption bar code on the other portion of the touchscreen display of the mobile device of the recipient by an employee of the venue;

receiving the item by the recipient from another employee of the venue; and paying for the item by the user using payment information stored via the mobile app once the item is redeemed by the recipient.

2. The social networking method for organizing nighttime activities as recited in claim 1, wherein the step of selecting an item from the interactive screen for selecting an item of food or drink in the other portion of the touchscreen to purchase from the venue further comprises: displaying a category selection screen comprising a drink purchase icon and a food purchase icon;

selecting one of the drink purchase icon and food purchase icon on the touchscreen of the mobile device by the user;

providing a plurality of items from the group consisting of drink items and food items on the touchscreen of the mobile device by the user according to which one of the drink purchase icon and food purchase icon is selected by the user; and selecting an item from the drink items and food items by the user using the touchscreen of the mobile device.

3. The social networking method for organizing nighttime activities as recited in claim 2, wherein the mode selection bar comprises a transportation icon for selecting a transportation mode, and the step of selecting one of the individual venues by the user is followed by the step of arranging transportation of the user to the venue by the transportation mode of the mobile app, wherein the user can set a pickup and drop-off location using the mobile app.

4. The social networking method for organizing nighttime activities as recited in claim 3, wherein the step of arranging transportation of the user to the venue further comprises establishing a transportation cost according to the pickup and drop-off locations, displaying the individuals in the crew on the mobile device, selecting by the user the individuals from the crew that will split payment for transportation, and paying by each of the selected individuals a portion of the transportation cost using the app.

5. The social networking method for organizing nighttime activities as recited in claim 4, wherein the step of selecting one of the individual venues further comprises displaying a venue detail screen containing locational information about the venue, a visual image of the venue and a check in icon, and selecting the check in icon to select that individual venue.

6. The social networking method for organizing nighttime activities as recited in claim 5, wherein the step of displaying a user list further comprises displaying a user list by the mobile app within the venue detail screen, providing a girl list icon and a guy list icon, selecting the girl list icon to view a girl list screen on the mobile device, and selecting the guy list icon to view a guy list screen on the mobile device, wherein the girl list screen and guy list screen each have an array of profile icons from other individual users.

7. The social networking method for organizing nighttime activities as recited in claim 6, wherein the venue detail screen for each individual venue provides icons for viewing information regarding dress code for the individual venue, drinks and promotions, cover charge information, as well as a calendar of upcoming events.

8. The social networking method for organizing nighttime activities as recited in claim 1, wherein the persistent mode selection bar comprises a chat icon for selecting a chat mode, a profile icon for selecting a profile mode, and a transportation icon for selecting a transportation mode.

\* \* \* \* \*